United States Patent
Townsend

(10) Patent No.: US 6,678,963 B1
(45) Date of Patent: Jan. 20, 2004

(54) PLANT TRIMMING GUIDE APPARATUS

(76) Inventor: Cortez Townsend, 14530 County Cress Dr., Houston, TX (US) 77047

( * ) Notice: Subject to any disclaimer, the term of this patent is extended or adjusted under 35 U.S.C. 154(b) by 0 days.

(21) Appl. No.: 10/120,237

(22) Filed: Apr. 11, 2002

(51) Int. Cl.[7] ............................................ G01B 3/14
(52) U.S. Cl. ................................................ 33/521
(58) Field of Search ........................ 33/521, 545, 546, 33/562

(56) References Cited

U.S. PATENT DOCUMENTS

| | | | | |
|---|---|---|---|---|
| 975,057 A | * | 11/1910 | Meeks | 33/521 |
| 2,478,081 A | * | 8/1949 | Beets | 33/521 |
| 2,679,691 A | * | 6/1954 | Brownell | 33/521 |
| 2,883,756 A | * | 4/1959 | Caldwell | 33/521 |
| 4,044,472 A | * | 8/1977 | Jue | 33/521 |
| 4,386,466 A | * | 6/1983 | Lee | 33/515 |

* cited by examiner

Primary Examiner—Christopher W. Fulton

(57) ABSTRACT

A plant trimming guide apparatus for creating a pattern from which brushes, shrubs, and trees can be neatly trimmed. The plant trimming guide apparatus includes a support assembly including a plurality of telescoping leg members; and also includes a trimmer guide assembly being mounted to the support assembly and including upper guide members being adapted to extend over a plant, and also including lower guide members being adapted to extend about a bottom portion of the plant.

4 Claims, 3 Drawing Sheets

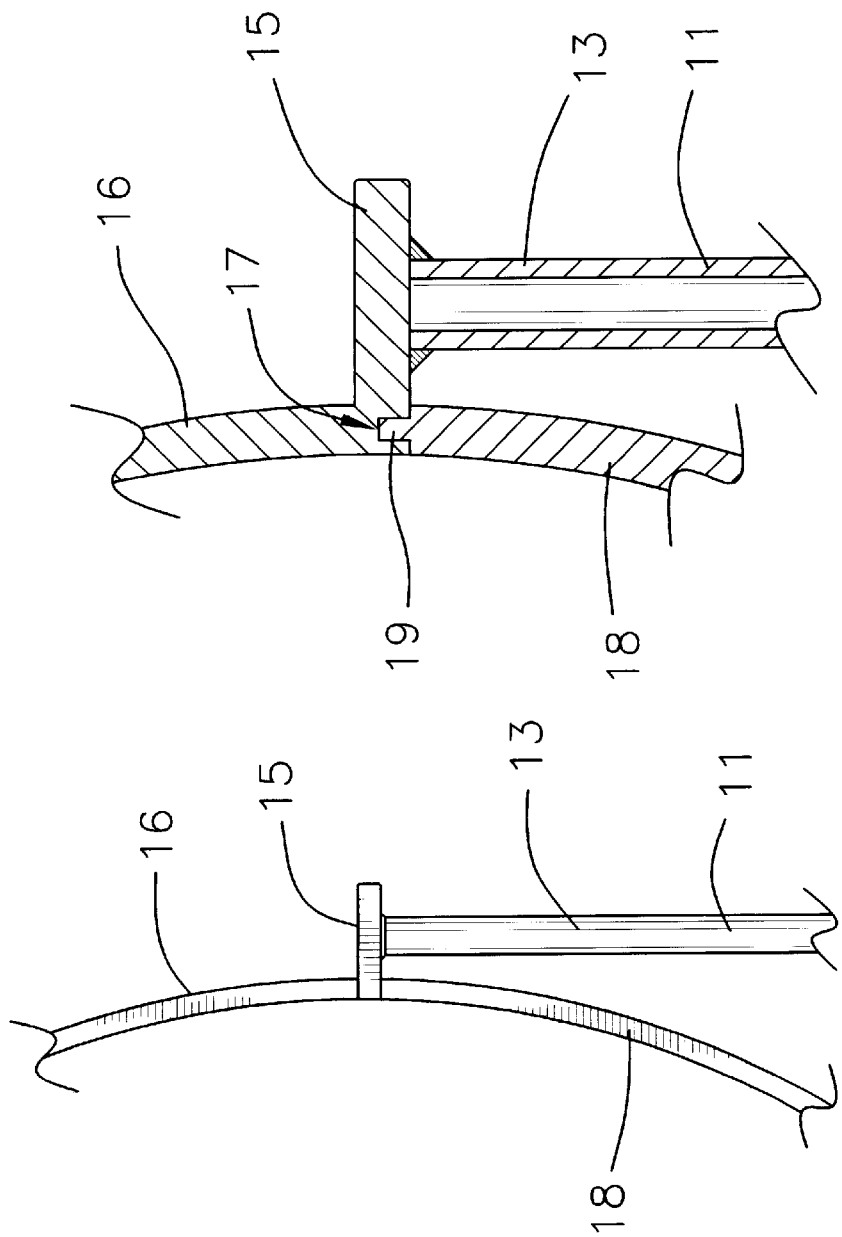

PLANT TRIMMING GUIDE APPARATUS

BACKGROUND OF THE INVENTION

1. Field of the Invention

The present invention relates to plant trimmer guides and more particularly pertains to a new plant trimming guide apparatus for creating a pattern from which brushes, shrubs, and trees can be neatly trimmed.

2. Description of the Prior Art

The use of plant trimmer guides is known in the prior art. More specifically, plant trimmer guides heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,044,472; 2,679,691; 2,478,081; 4,989,336; and 2,883,756.

While these devices fulfill their respective, particular objectives and requirements, the aforementioned patents do not disclose a new plant trimming guide apparatus. The prior art includes inventions having brackets which are directly attached to the plant and also have curved members to establish the pattern to be followed for trimming.

SUMMARY OF THE INVENTION

The general purpose of the present invention, which will be described subsequently in greater detail, is to provide a new plant trimming guide apparatus which has many of the advantages of the plant trimmer guides mentioned heretofore and many novel features that result in a new plant trimming guide apparatus which is not anticipated, rendered obvious, suggested, or even implied by any of the prior art plant trimmer guides, either alone or in any combination thereof. The present invention includes a support assembly including a plurality of telescoping leg members; and also includes a trimmer guide assembly being mounted to the support assembly and including upper guide members being adapted to extend over a plant, and also including lower guide members being adapted to extend about a bottom portion of the plant. None of the prior art described inventions having free-standing leg members nor having semi-circular ring members nor arcuate arm members which are easily attachable and detachable to the leg members.

There has thus been outlined, rather broadly, the more important features of the plant trimming guide apparatus in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new plant trimming guide apparatus which has many of the advantages of the plant trimmer guides mentioned heretofore and many novel features that result in a new plant trimming guide apparatus which is not anticipated, rendered obvious, suggested, or even implied by any of the prior art plant trimmer guides, either alone or in any combination thereof.

Still another object of the present invention is to provide a new plant trimming guide apparatus for creating a pattern from which brushes, shrubs, and trees can be neatly trimmed.

Still yet another object of the present invention is to provide new plant trimming guide apparatus that is easy and convenient to set up and use.

Even still another object of the present invention is to provide a new plant trimming guide apparatus that saves the user substantial time and also eliminates trimming errors.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a detailed partial side view of the present invention.

FIG. 4 is a detailed partial cross-sectional view of the present invention.

DESCRIPTION OF THE PREFERRED EMBODIMENT

Figure 1:
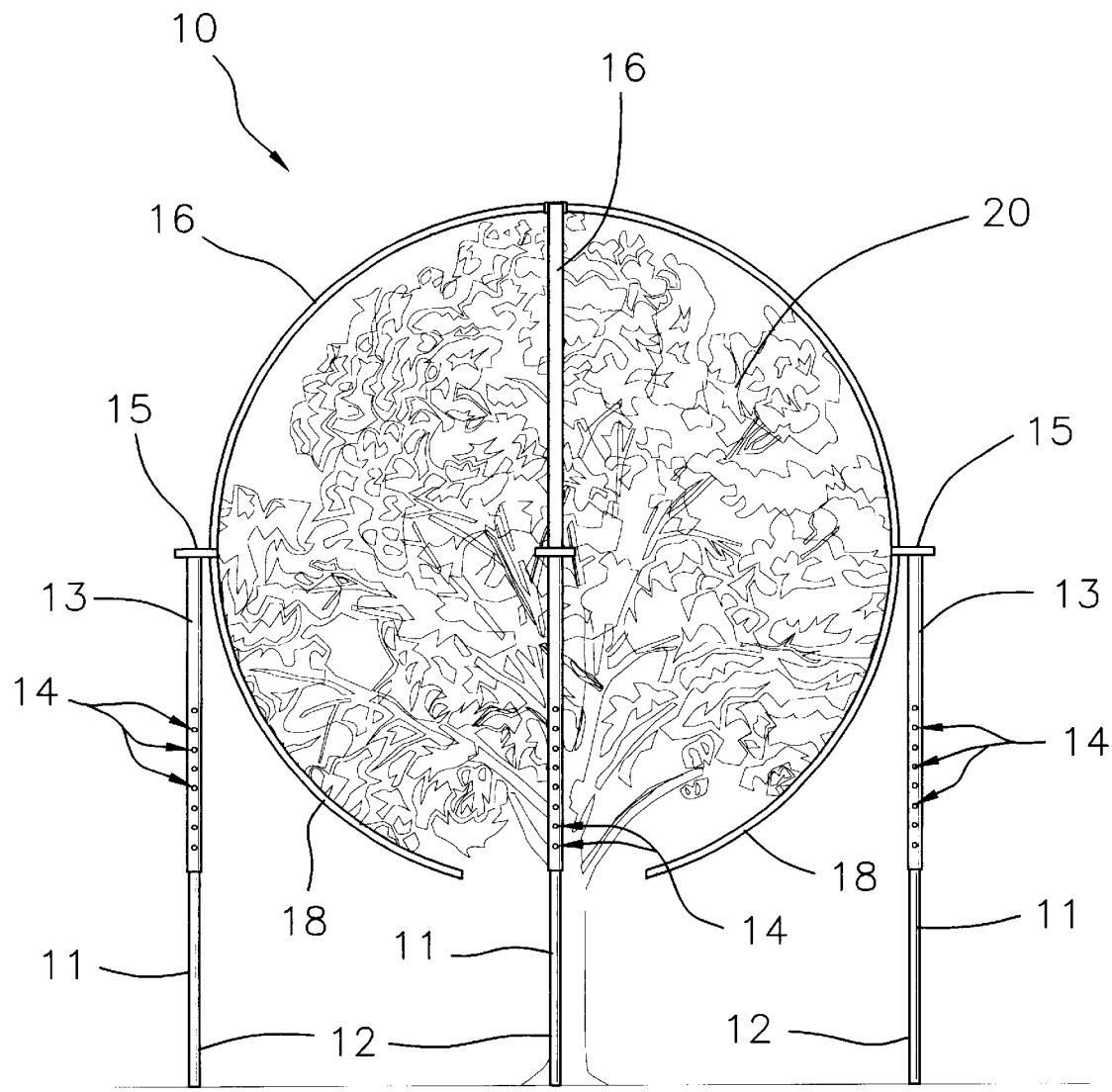
FIG. 1 is a side elevational view of a new plant trimming guide apparatus according to the present invention and shown in use.
Figure 2:
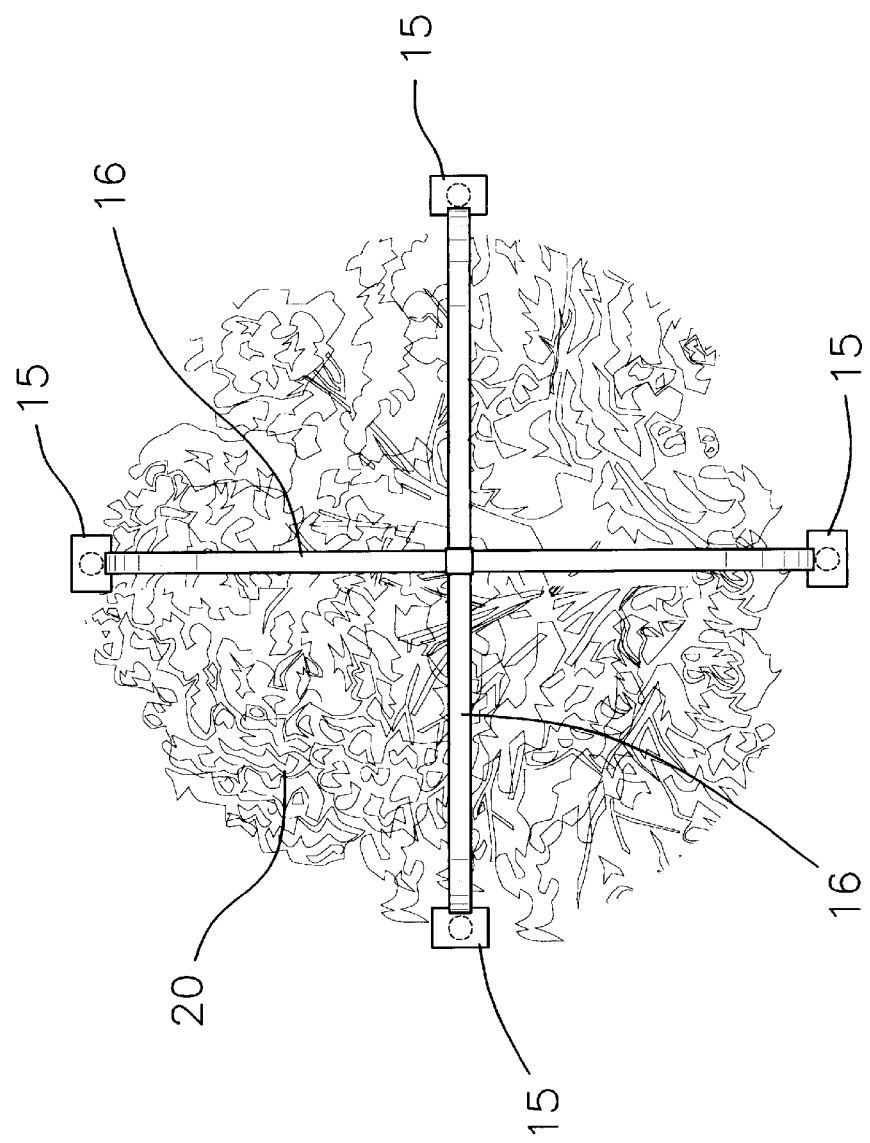
FIG. 2 is a top plan view of the present invention.

With reference now to the drawings, and in particular to FIGS. 1 through 4 thereof, a new plant trimming guide apparatus embodying the principles and concepts of the present invention and generally designated by the reference numeral 10 will be described.

As best illustrated in FIGS. 1 through 4, the plant trimming guide apparatus 10 generally comprises a support assembly including a plurality of telescoping leg members 11. Each of the telescoping leg members 11 includes an elongate base member 12 being adapted to stand upon a ground surface, and also includes an elongate tubular member 13 having a plurality of holes 14 being spacedly disposed along and through a wall of the elongate tubular member 13. The elongate tubular member 13 is adjustably and fastenably mounted with a conventional fastener upon and extendable from the elongate base member 12.

A trimmer guide assembly is conventionally mounted to the support assembly and includes upper guide members 16 being adapted to extend over a plant 20, and also includes lower guide members 18 being adapted to extend about a bottom portion of the plant 20. The trimmer guide assembly further includes a plurality of bracket members 15 being conventionally mounted upon top ends of the elongate tubular members 13. The upper guide members 16 are semi-circular ring members having ends which are securely and conventionally attached and welded to the bracket members 15. The semi-circular ring members 16 crisscross one another at intermediate portions thereof. Each of the semi-circular rings 16 is attached to the telescoping leg members 11 which are diametrically opposed to one another. Each of the semi-circular rings 16 has slots 17 being disposed in the ends thereof. The lower guide members 18 are arcuate arm members each having a node 19 being conventionally disposed from an end thereof and being removably and securely received in a respective slot 17 of a respective semi-circular ring 16. The arcuate arm members 18 are adapted to be curved inwardly of the plant 20 and are suspended from the semi-circular ring members 16.

In use, the user positions the telescoping leg members 11 about a plant 20 to be trimmed with the telescoping leg members 11 being positioned at approximately 90 degrees apart. The user then attaches the bracket members 15 to the elongate tubular members 13, and extends the semi-circular ring members 16 over the plant 20, and then attaches the arcuate arm members 18 to the ends of the semi-circular ring members 16 and can begin to trim the tree with a hedging tool and can follow the pattern established by the upper and lower guide members 16,18. Once finished, the user can easily and quickly dismantle the plant trimming guide apparatus 10.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the plant trimming guide apparatus. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A plant trimming guide apparatus as described in claim 3, comprising:

a support assembly including a plurality of telescoping leg members, each of said telescoping leg members including an elongate base member being adapted to stand upon a ground surface, and also including an elongate tubular member having a plurality of holes being spacedly disposed alone and through a wall of said elongate tubular member and being adjustably and fastenably mounted with a fastener upon and extendable from said elongate base member; and a trimmer guide assembly being mounted to said support assembly and including upper guide members being adapted to extend over a plant, and also including lower guide members being adapted to extend about a bottom portion of the plant, said trimmer guide assembly further including a plurality of bracket members being mounted upon top ends of said elongate tubular members, said upper guide members being semi-circular ring members having ends which are securely attached to said bracket members, said semi-circular ring members crisscross one another at intermediate portions thereof.

2. A plant trimming guide apparatus as described in claim 1, wherein each of said semi-circular rings is attached to said telescoping leg members which are diametrically opposed to one another.

3. A plant trimming guide apparatus as described in claim 1, wherein each of said semi-circular rings has slots being disposed in said ends thereof.

4. A plant trimming guide apparatus as described in claim 3, wherein said lower guide members are arcuate arm members each having a node being disposed from an end thereof and being removably and securely received in a respective said slot of a respective said semi-circular ring, said arcuate arm members being adapted to be curved inwardly of the plant and being suspended from said semi-circular ring members.

\* \* \* \* \*